United States Patent
Wang et al.

(10) Patent No.: US 7,086,814 B2
(45) Date of Patent: Aug. 8, 2006

(54) C-TYPE COLUMN STRUCTURE

(75) Inventors: Shih-Ming Wang, Taipei (TW);
 Hung-Wei Liao, Taipei (TW)

(73) Assignee: Chung Yuan Christian University, Taoyuan (TW)

( * ) Notice: Subject to any disclaimer, the term of this patent is extended or adjusted under 35 U.S.C. 154(b) by 66 days.

(21) Appl. No.: 11/003,492

(22) Filed: Dec. 6, 2004

(65) Prior Publication Data

US 2005/0260053 A1 Nov. 24, 2005

(30) Foreign Application Priority Data

May 19, 2004 (TW) .............................. 93114073 A

(51) Int. Cl.
 *B23Q 1/01* (2006.01)
(52) U.S. Cl. ............... 409/235; 409/234; 29/DIG. 101; 52/731.4
(58) Field of Classification Search ................ 409/235, 409/238–239; 408/234; 82/149; 451/340, 451/360, 361; 144/286.5, 286.1; 29/DIG. 101; 83/859; 52/736.2, 726.4, 731.4; 428/188
 See application file for complete search history.

(56) References Cited

U.S. PATENT DOCUMENTS

| | | | | |
|---|---|---|---|---|
| 2,789,480 A | * | 4/1957 | Wellauer | 409/235 |
| 3,901,127 A | * | 8/1975 | Stone | 408/234 |
| 4,242,019 A | * | 12/1980 | Roch | 409/235 |
| RE31,304 E | * | 7/1983 | Tsukiji | 408/234 |
| 4,632,615 A | * | 12/1986 | Yamamura | 409/235 |
| 5,368,425 A | * | 11/1994 | Mills et al. | 409/235 |
| 6,203,256 B1 | * | 3/2001 | Liao | 409/235 |
| 2002/0031411 A1 | * | 3/2002 | Geiger et al. | 409/235 |
| 2002/0197125 A1 | * | 12/2002 | Yen et al. | 409/238 |

OTHER PUBLICATIONS

Duracraft Owner's Manual for Model DH-890 Series, 2.0 Gallon output model, 12 pages, copyright 2001.*

* cited by examiner

*Primary Examiner*—Erica Cadugan
(74) *Attorney, Agent, or Firm*—Birch, Stewart, Kolasch & Birch LLP

(57) ABSTRACT

A C-type column structure. The C-type column structure includes a hollow column, a column extending portion, and a support portion. The hollow column is formed with a closed U-shaped cross section, a curved portion, a trapezoid portion, a first end surface, and a second end surface. The curved portion is connected to the trapezoid portion to form the hollow column. The first end surface is opposite to the second end surface. The hollow column expands uniformly from the first end surface to the second end surface and has a predetermined thickness. The column extending portion is connected to the trapezoid portion and is adjacent to the first end surface. The support portion is connected to the trapezoid and column extending portions and is under the column extending portion.

7 Claims, 6 Drawing Sheets

| Mode | Resonance frequency (Hz) | Vibration type |
|---|---|---|
| 1 | 55.489 | Forward and backward bending along the central axis of the machine tool |
| 2 | 57.195 | Leftward and rightward vacillation |
| 3 | 154.004 | Bending and vibration along the Y-direction |
| 4 | 181.91 | Bending and vibration along the Z-direction |
| 5 | 242.311 | Bending and vibration of the spindle head along the Y-direction |
| 6 | 286.722 | Bending and vibration of the spindle head along the Z-direction |

FIG. 3 (RELATED ART)

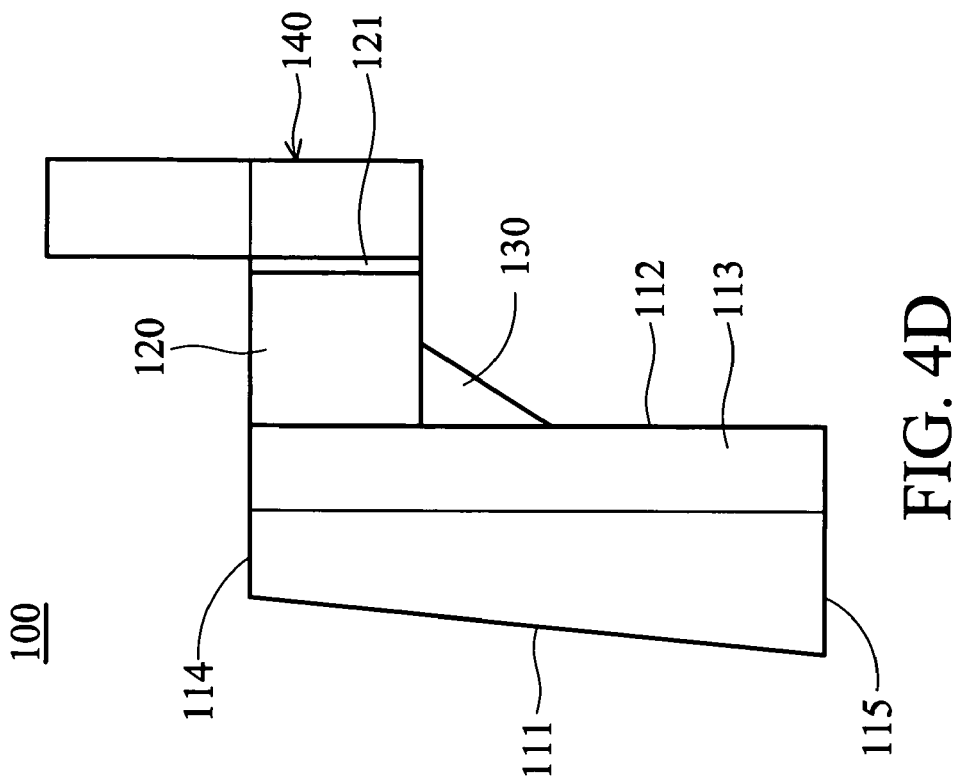
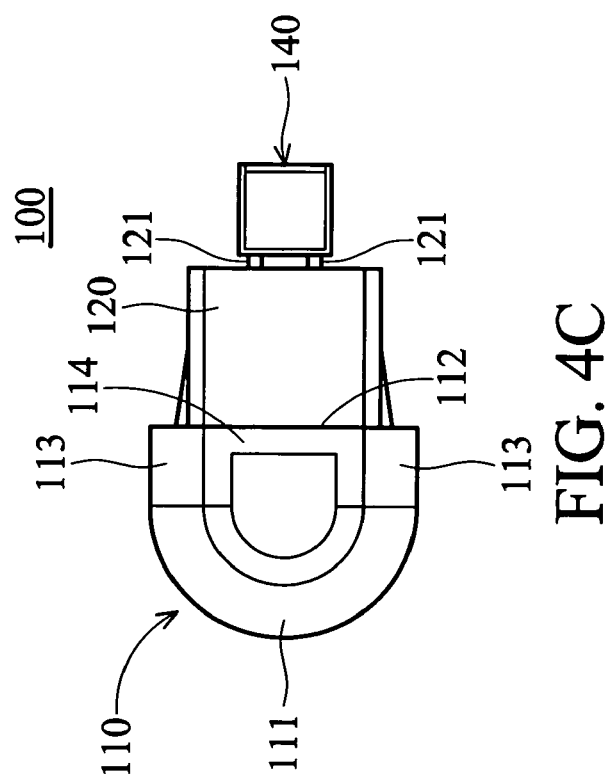
FIG. 4D
FIG. 4C

| Mode | Resonance frequency (Hz) | Vibration type |
|---|---|---|
| 1 | 96.806 | Forward and backward bending along the central axis of the machine tool |
| 2 | 106.33 | Leftward and rightward vacillation |
| 3 | 231.15 | Bending and vibration along the Y-direction |
| 4 | 235.88 | Bending and vibration along the Z-direction |
| 5 | 260.78 | Bending and vibration of the spindle head along the Y-direction |
| 6 | 385.03 | Bending and vibration of the spindle head along the Z-direction |

FIG. 5

C-TYPE COLUMN STRUCTURE

BACKGROUND

The present invention relates to a C-type column structure, and in particular to a C-type column structure that provides enhanced structural rigidity.

Many researchers are devoted to optimal design of rigidity for mechanical structures. Static and dynamic rigidity of the mechanical structures can be improved by analysis, enhancing dynamic precision during processing operations thereof. Conventionally, to obtain higher dynamic performance during design of a machine tool, structural configuration thereof is overly simplified. Thus, the analysis of the dynamic performance or rigidity of the machine tool is often inaccurate.

Referring to FIG. 1, a conventional machine tool (such as a CNC machine tool) comprises a column 1, a working table 20, and a spindle head 3. Two sliding rails 12 are disposed on the column 1. The spindle head 3 is slidably disposed on the sliding rails 12, moving upward and downward in Y-direction. The spindle head 3 can selectively hold a cutting tool. Sliding tables 21 and 22 are disposed on a base 2, respectively moving in Z-direction and X-direction. When a workpiece (not shown) is fixed on the working table 20, the machine tool can execute three dimensional processing by means of the cutting tool being fixed on the spindle head 3. Additionally, the conventional machine tool further comprises a balance weight (such as a metal piece, not shown) disposed in the interior of the column 1 and connected to the spindle head 3 by means of two chains 4. The balance weight can enhance rigidity or stability of the spindle head 3.

Nevertheless, when the workpiece is processed by the conventional machine tool, up and down processing movement of the spindle head 3 and forward, back, right, and left movements of the working table 20 cause vibration or resonance in the column 1. Errors by which the spindle head 3 processes the workpiece are thus generated. Also, the cutting tool or mold may be damaged, adversely affecting the performance of the machine tool.

Referring to FIG. 2, another column 5 is used in the machine tool to enhance the static and dynamic rigidity thereof. Specifically, the column 5 is substantially cuboid and hollow to reduce weight and material cost thereof. Further, the hollow interior of the column 5 is formed with a cellular structure. As shown in FIG. 2, a spindle head 6 can be slidably disposed on the column 5, moving up and down. Similarly, the column 5 can selectively hold a cutting tool.

Accordingly, to determine structural rigidity and probability of resonance of the column 5, ANSYS, engineering analytic software, can analyze and experiment with dynamic compliance and resonance frequency therefor. Specifically, the structural rigidity of the column 5 can be determined by the dynamic compliance analysis. Generally, the lower the dynamic compliance value, the better the anti-vibration capability of the column 5 and the higher the structural rigidity thereof. Moreover, higher resonance frequency values indicate that the column 5 is not easily resonated by external force. Based on analysis and experimentation with dynamic compliance and resonance frequency, resonance frequency values of the column 5 are shown in FIG. 3. When the spindle head 6 is on the top of the column 5 and a cutting force of 215 N along X-direction and a cutting force of 430 N along Z-direction are imitatively applied thereon, the dynamic compliance value of the column 5 is about $6.83 \times 10^{-7}$ m/N. Generally, to assure sufficient rigidity of the column of the machine tool, the standard dynamic compliance value is $3 \times 10^{-7}$ m/N. The dynamic compliance value ($6.83 \times 10^{-7}$ m/N) of the column 5, however, exceeds the standard dynamic compliance value ($3 \times 10^{-7}$ m/N). Namely, the column 5 will be easily deflected and deformed in Z-direction when subject to cutting forces.

As shown in FIG. 3, the resonance frequency value of the column 5 in the first mode is merely 55.489 Hz, easily causing resonance therein.

Hence, there is a need to provide an improved column structure that can remarkably enhance the structural rigidity thereof and reduce the weight thereof.

SUMMARY

A C-type column structure of an embodiment of the invention comprises a hollow column, a column extending portion, and a support portion. The hollow column is formed with a closed U-shaped cross section, a curved portion, a trapezoid portion, a first end surface, and a second end surface. The curved portion is connected to the trapezoid portion to form the hollow column. The first end surface is opposite to the second end surface. The hollow column expands uniformly from the first end surface to the second end surface and has a predetermined thickness. The column extending portion is connected to the trapezoid portion and is adjacent to the first end surface. The support portion is connected to the trapezoid and column extending portions and is under the column extending portion.

The C-type column structure further comprises two rectangular portions opposite each other. The curved portion is connected to the trapezoid portion via the rectangular portions.

The first end surface parallels the second end surface, and the trapezoid portion is perpendicular to the first and second end surfaces.

The column extending portion further comprises at least one sliding rail opposite to the trapezoid portion.

The column extending portion is substantially cuboid and expands gradually from the first end surface to the second end surface.

The support portion is substantially a triangle pole.

The hollow column, column extending portion, and support portion are integrally formed.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 3 is a table showing analysis values of resonance frequency according to the conventional column of FIG. 2;

FIG. 4C is a schematic top view according to FIG. 4A;

FIG. 4D is a schematic side view according to FIG. 4A; and

FIG. 5 is a table showing the analysis values of resonance frequency according to the C-type column structure.

DETAILED DESCRIPTION

Referring to FIGS. 4A, 4B, 4C, and 4D, the C-type column structure 100 comprises a hollow column 110, a column extending portion 120, and a support portion 130.

Figure 1:
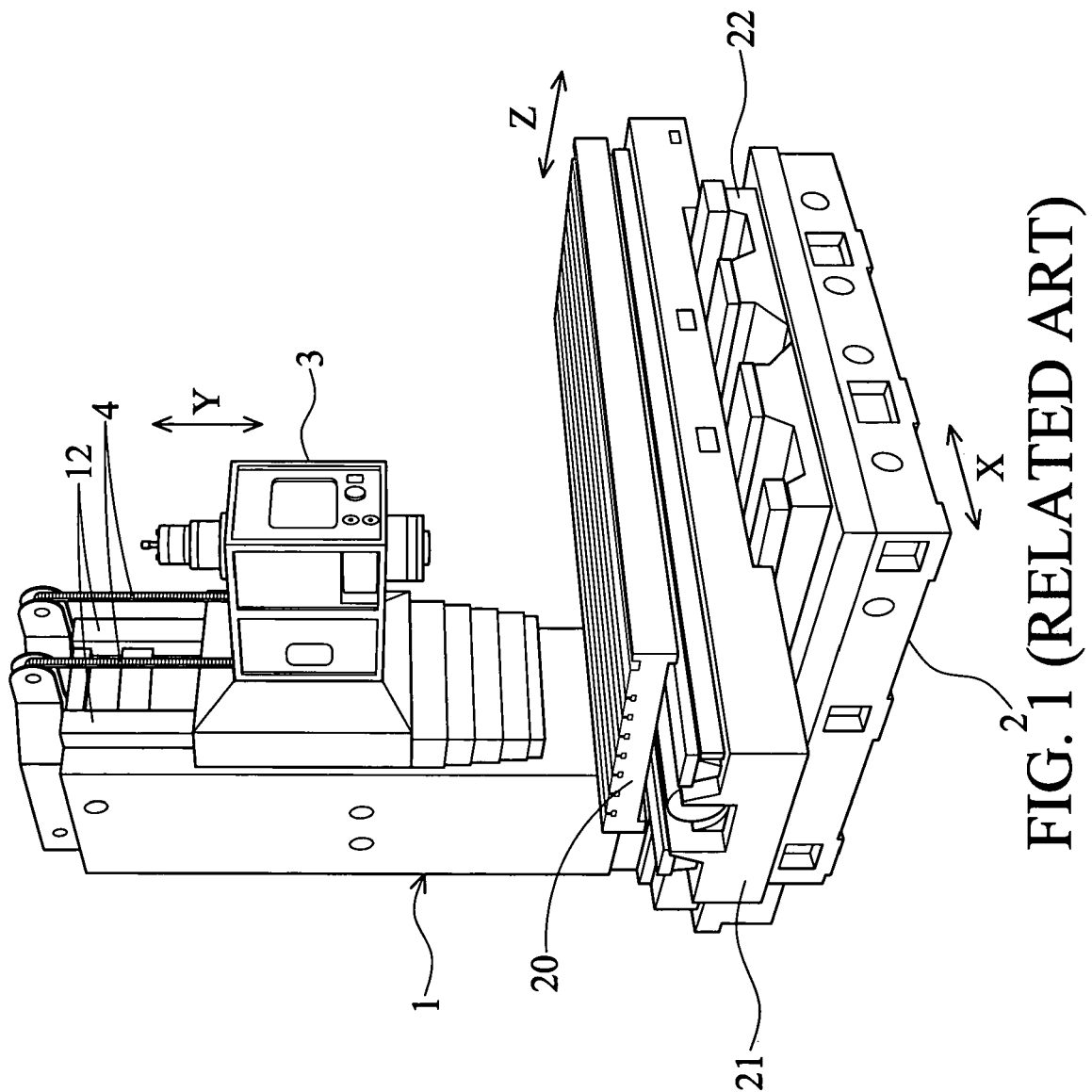
FIG. 1 is a schematic perspective view of a conventional column and a working table deployed in a machine tool.
Figure 2:
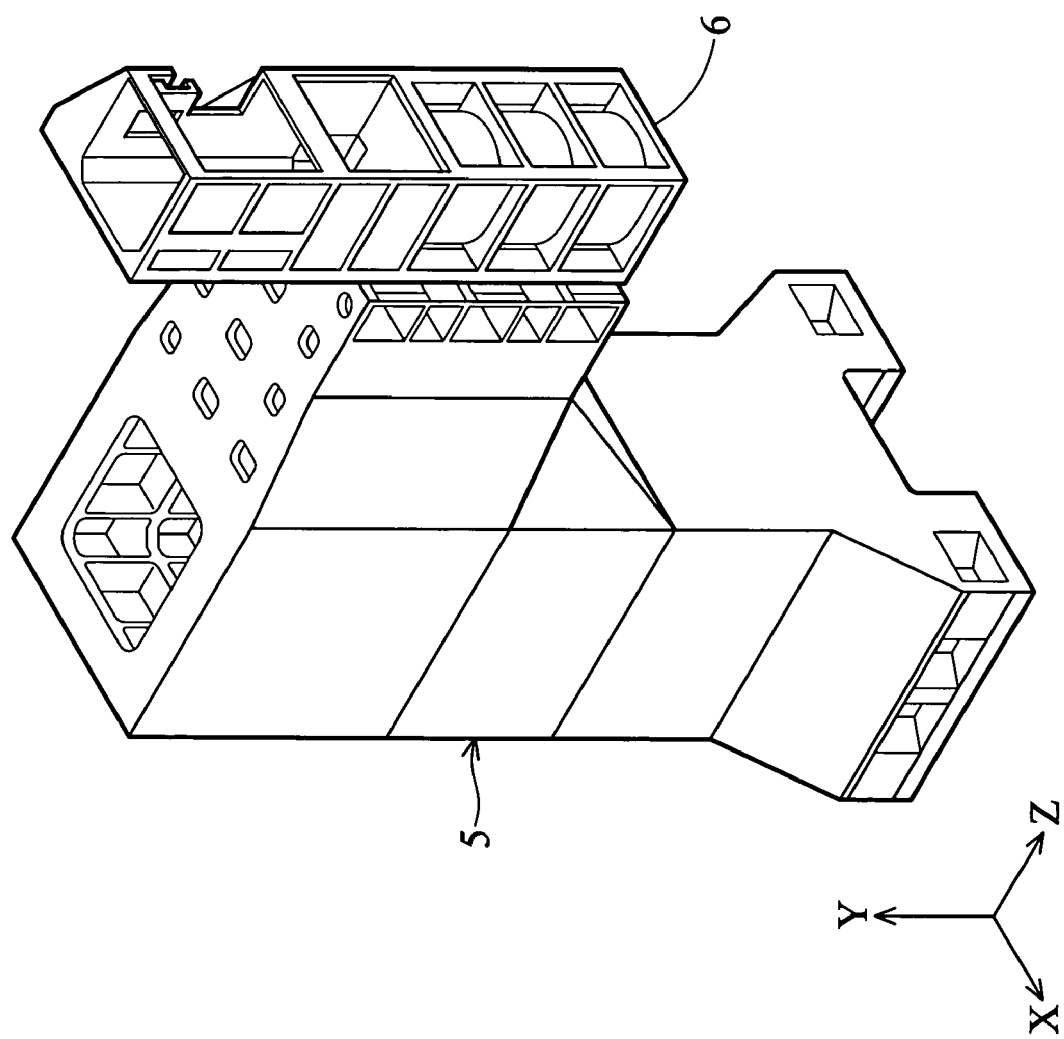
FIG. 2 is a schematic perspective view of another conventional column.
Figure 4B:
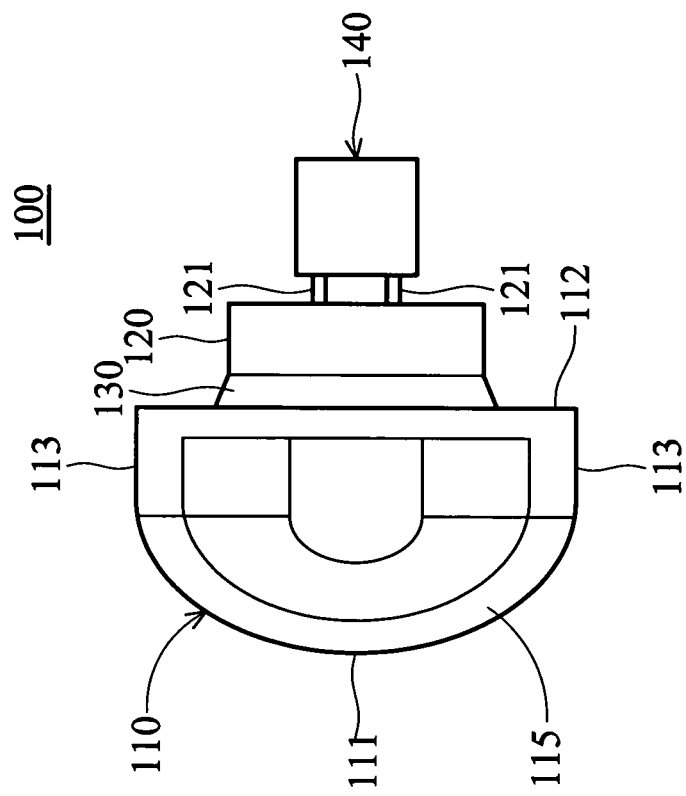
FIG. 4B is a schematic bottom view according to FIG. 4A.

The hollow column 110 comprises a curved portion 111, a trapezoid portion 12, and two rectangular portions 113 opposite thereto. The curved portion 111 is connected to the trapezoid portion 112 via the rectangular portions 113 to form the hollow column 110. The hollow column 110 further comprises a first end surface 114 and a second end surface 115 opposite and parallel thereto. The trapezoid portion 12 is perpendicular to the first end surface 114 and second end surface 115. Specifically, the hollow column 110 expands uniformly from the first end surface 114 to the second end surface 115. As shown in FIG. 4B and FIG. 4C, the hollow column 110 has a closed U-shaped cross section and a predetermined thickness.

The column extending portion 120 is connected to the trapezoid portion 112 of the hollow column 110 and is adjacent to the first end surface 114 thereof. Additionally, two sliding rails 121 are disposed on the column extending portion 120 and opposite to the trapezoid portion 112 of the hollow column 110. A spindle head 140 is slidably disposed on the sliding rails 121, moving relative to the column extending portion 120. Namely, when the C-type column structure 100 is deployed in a machine tool, the spindle head 140 can move up and down. Similarly, the spindle head 140 can selectively hold a cutting tool to process a workpiece (not shown) fixed on a working table (not shown) of the machine tool. Moreover, because of the column extending portion 120, a processing space in which the working table and spindle head 140 operate is provided between the hollow column 110 and the working table, enabling processing on the workpiece.

The support portion 130 is connected to the trapezoid portion 12 and column extending portion 120 and is disposed under the column extending portion 120. In addition to assisting in support of the column extending portion 120, the support portion 130 enhances overall rigidity of the C-type column structure 100.

Figure 4A:
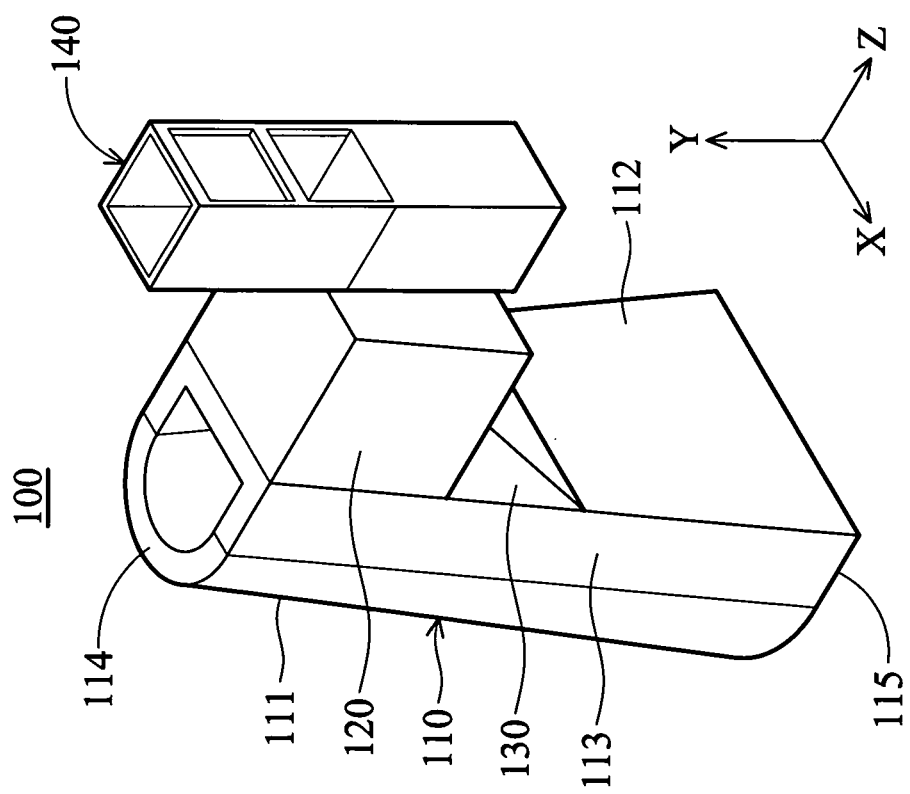
FIG. 4A is a schematic perspective view of a C-type column structure.

As shown in FIG. 4A and FIG. 4D, the column extending portion 120 is substantially cuboid and expands gradually from the first end surface 114 to the second end surface 115. The support portion 130 is substantially a triangle pole.

Moreover, the hollow column 110, column extending portion 120, and support portion 130 are integrally formed.

To determine structural rigidity and probability of resonance of the C-type column structure 100, ANSYS can perform analyses and experiments of dynamic compliance and resonance frequency thereof. Accordingly, resonance frequency values of the C-type column structure 100 are shown in FIG. 5. The maximum dynamic compliance value of the C-type column structure 100 is about $2.5 \times 10^{-7}$ m/N, less than the standard dynamic compliance value ($3 \times 10^{-7}$ m/N). Accordingly, the anti-vibration capability and structural rigidity of the C-type column structure 100 improve on those of the column 5.

As shown in FIG. 5, the resonance frequency value of the C-type column structure 100 in the first mode is 96.806 Hz, remarkably exceeding that (55.489 Hz) of the column 5 in the first mode. Also, the resonance frequency values of the C-type column structure 100 exceed those of the column 5 in other modes. Thus, as compared with the column 5, resonance is suppressed in the C-type column structure 100 when external force is applied thereto.

To conclude, the C-type column structure 100 has many advantages as follows. Since the rigidity of the C-type column structure 100 is enhanced by changing the configuration thereof, use of expensive material (such as superalloy) is not required, thus reducing manufacturing costs thereof. The C-type column structure 100 is light-weight. The C-type column structure 100 can enhance the dynamic cutting performance and precision of the machine tool. Balance weight and chains are not required and movement performance of the spindle head can thereby be enhanced. The C-type column structure 100 can operate with a light spindle head to avoid temporary cutter halt generated during high feed-rate cutting operation in reversal motion, promoting the surface and contouring precision of the workpiece.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A C-type column structure of a machining tool, comprising:
    a hollow column, with a closed U-shaped cross section, a curved portion, a trapezoid portion, a first end surface, and a second end surface, wherein the curved portion is connected to the trapezoid portion to form the hollow column, the first end surface is opposite to the second end surface, and the hollow column expands uniformly from the first end surface to the second end surface and has a predetermined thickness;
    a column extending portion connected to the trapezoid portion and adjacent to the first end surface; and
    a support portion connected to the trapezoid and column extending portions and under the column extending portion.

2. The C-type column structure as claimed in claim 1, further comprising two rectangular portions opposite to each other, wherein the curved portion is connected to the trapezoid portion via the rectangular portions.

3. The C-type column structure as claimed in claim 1, wherein the first end surface parallels the second end surface, and the trapezoid portion is perpendicular to the first and second end surfaces.

4. The C-type column structure as claimed in claim 1, wherein the column extending portion further comprises at least one sliding rail opposite to the trapezoid portion.

5. The C-type column structure as claimed in claim 1, wherein the column extending portion is substantially cuboid and expands gradually from the first end surface to the second end surface.

6. The C-type column structure as claimed in claim 1, wherein the support portion is substantially a triangle pole.

7. The C-type column structure as claimed in claim 1, wherein the hollow column, column extending portion, and support portion are integrally formed.

* * * * *